Patented Nov. 13, 1945

2,388,775

UNITED STATES PATENT OFFICE 2,388,775

PROCESS FOR RECOVERING SODIUM CHROMATE

Marvin J. Udy, Niagara Falls, N. Y.

No Drawing. Application January 8, 1942, Serial No. 426,045

6 Claims. (Cl. 23—56)

This invention relates to chromium recovery and has for an object the provision of certain improvements in methods or processes for recovering chromium from chromium-bearing materials such as chromite ores. More particularly, the invention contemplates the provision of certain improvements in methods or processes for recovering chromium in the form of chromate compounds. A particular object of the invention is to provide an improved method or process for separating chromate compounds from crude chromate-bearing material of the type of charges resulting from the oxidation of chromite ore or ferrochromium in air and in the presence of basic compounds such as lime and soda ash. A further object of the invention is to provide an improved method of separating sodium chromate in solid form from aqueous solutions of the same.

According to some heretofore customary practices, sodium chromate is produced by roasting in air oxidation charges comprising intimate mixtures of finely divided particles of chromite ore, lime (or limestone) and soda ash. Lime or limestone usually is employed as diluent for maintaining the charge porous to permit effective oxidation of the chromium of the ore and chemical combination of the oxidized chromium with the sodium oxide of the soda ash with the production of sodium chromate. In the course of the oxidation treatment, some calcium oxide (CaO) of the lime or limestone employed may combine with oxidized chromium to form calcium chromate. The oxidation treatment may be controlled to produce different relative amounts of calcium chromate and sodium chromate within certain limits by controlling the amounts and proportions of lime and soda ash in the charge.

The product resulting from the oxidation treatment of the charge comprising chromite ore, lime and soda ash is leached with water to extract the water-soluble sodium chromate, and the water solution of sodium chromate is evaporated to effect crystallization of the sodium chromate. Some sodium carbonate may be included in the leaching liquor to convert any difficultly soluble calcium chromate contained in the roasted charge to readily soluble sodium chromate. Leaching and evaporation are relatively costly operations. Evaporation costs are proportionate to the efficiency of leaching with respect to the concentration of sodium chromate in the final leaching liquor and leaching costs are substantially proportionate to the amount of equipment employed. Sodium chromate is highly soluble in water, but, in commercial operations, it is impracticable to obtain complete saturation with respect to sodium chromate. The production of a saturated leaching liquor in order to maintain evaporation costs at the minimum would involve the use of an amount of equipment and so many leaching steps as to be impracticable. Consequently, in operations of the type carried out heretofore, leaching operations are so conducted as to produce only partly saturated final leaching solutions, the degree of saturation (or content of sodium chromate) of the final leaching liquor or solution depending upon economic balancing or correlation of the leaching and evaporation costs.

According to some heretofore customary practices, leaching operations are so controlled as to produce final leaching liquors which are about twenty to forty precent saturated with sodium chromate. Such liquors contain sodium chromate in about the range 150 grams per liter to about 300 grams per liter. Since, at a temperature of about 25° C., a saturated neutral solution of sodium chromate ($Na_2CrO_4$) in water will contain more than 700 grams of sodium chromate per liter of solution, it is apparent that an evaporation treatment of a neutral solution containing about 150 to 300 grams of sodium chromate per liter will require evaporation of as much as eighty percent of the water content before any precipitation or crystallization of solid sodium chromate can take place upon cooling of the solution to about 25° C. and evaporation of more than eighty percent of the water content to provide for precipitation or crystallization of more than fifty percent of the sodium chromate upon cooling of the solution to about 25° C.

The present invention is based on my discovery that sodium hydroxide functions as a salting-out agent for sodium chromate when present in an aqueous solution of sodium chromate during evaporation treatment of the solution. I have discovered, also, that the presence of sodium hydroxide in leaching liquors in limited amounts up to about twenty-five to thirty percent by weight does not interfere with the leaching operation; that leaching liquors containing sodium hydroxide in such amounts can be employed substantially as effectively as pure water to produce final leaching liquors or solutions of sodium chromate containing sodium chromate in amounts equivalent to or greater than the amounts contained in final leaching solutions or liquors produced in commercial processes of the type employed heretofore. I have found that leaching liquor in the form of an aqueous solution containing an amount of sodium hydroxide up to about thirty percent of the weight of the water in the solution can be employed efficiently to produce a final leaching liquor or solution containing sodium chromate in an amount about in the range 150 to 400 grams per liter of solution, and that an evaporation treatment of the solution sufficient to raise the concentration of sodium hydroxide to about thirty-five to forty percent of the weight of the water in the solution will result in precipitation or crystallization from solution of from about thirty-five to ninety percent of the sodium chromate at a temperature of about 25° C. Thus, for example, an aqueous solution of sodium hydroxide containing about twenty percent by weight of sodium hydroxide can be employed efficiently to produce a final leaching liquor containing more than four hundred grams of sodium chromate per liter of solution, and evaporation of an amount of water sufficient to raise the sodium hydroxide content to forty percent of the weight of the water in the solution will result in precipitation or crystallization of sodium chromate corresponding to about three hundred fifty grams per liter of the final leaching solution upon cooling of the solution to about 25° C. Thus, evaporation of less than fifty percent of the water results in precipitation of about ninety percent of the dissolved sodium chromate. Evaporation of fifty percent of the water of a neutral aqueous solution of sodium chromate containing the same amount of sodium chromate would effect the precipitation or crystallization of little or no sodium chromate.

Leaching and evaporation efficiencies of the process of the invention are illustrated by the following table of results obtained in solubility tests carried out at room temperature (about 70° F.) employing pure water and water solutions of sodium hydroxide as solvents for sodium chromate:

| Percent NaOH in original solution | Grams of sodium chromate ($Na_2CrO_4$) per liter of final solution |
| --- | --- |
| 0 | 720 |
| 5 | 638 |
| 10 | 574 |
| 15 | 476 |
| 20 | 436 |
| 25 | 402 |
| 30 | 147 |
| 35 | 99 |
| 40 | 66 |

Final solutions were prepared by saturating the original solutions with sodium chromate at temperature substantially higher than room temperature and thereafter cooling the solutions to room temperature to permit crystallization of excess sodium chromate to insure the production of saturated final solutions.

In the preferred process of the invention, I treat crude sodium chromate-bearing material with an aqueous solution of sodium hydroxide containing sodium hydroxide in amount such as to provide for effective leaching with the production of a final leaching liquor containing the desired amount of sodium chromate. I then separate the leaching liquor from insoluble material contained in the crude chromate-bearing material and heat the leaching liquor to evaporate sufficient water to increase the sodium hydroxide concentration of the remainder of the solution to a point at which, upon cooling of the solution, a desired proportion of the sodium chromate of the original final leaching solution will be obtained in solid form. The resulting solution is separated from the solid sodium chromate and utilized, after dilution to the desired extent with water, for leaching additional sodium chromate-bearing material. It is unnecessary to carry out complete evaporation of the leaching solution. The presence in the leaching solution of residual sodium chromate does not interfere with leaching. Evaporation need be carried out only to the extent that the amount of residual sodium chromate is not sufficiently large to form a burdensome load in the system.

Leaching of the crude chromate-bearing material may be carried out at any suitable temperature. Temperatures above about 25° C. may be employed satisfactorily. I prefer to conduct the leaching operation at a temperature between 25° C. and the boiling temperature of the leaching liquor, a temperature in the range 90° C. to 100° C. being satisfactory for most practical purposes.

In a preferred complete process of the invention, I may form a roasting or oxidation charge comprising chromite ore, lime or limestone and soda ash and roast the charge in air in accordance with heretofore customary practices. I then leach the roasted charge with an aqueous solution of sodium hydroxide containing about twenty to thirty percent by weight of sodium hydroxide. Leaching preferably is conducted under conditions such as to produce a final leaching liquor containing about three hundred to four hundred grams of sodium chromate per liter because of practical considerations. The final leaching liquor is heated to effect evaporation of sufficient water to produce, upon cooling to about 25° C., a solution containing less than one hundred grams of sodium chromate per liter and sodium hydroxide in amount equal to about thirty-five to forty percent of the weight of the water in the solution. The solution preferably is cooled to a temperature of about 25° C. or lower to effect precipitation of solid sodium chromate, and the liquid is separated from the solid sodium chromate, diluted with an amount of water corresponding to that evaporated and returned to the process for use in treating additional roasted material.

Instead of relying solely upon cooling of the solution after evaporation to effect precipitation or crystallization of the sodium chromate, I may continue the evaporation treatment to the point at which precipitation or crystallization takes place during the course of evaporation. In such a case, I may effect further precipitation or crystallization by cooling after evaporation or I may dilute the mother liquor for re-use immediately after separation of the solid sodium chromate. For separating the solid sodium chromate from the mother liquor, I prefer to employ a centrifuging operation.

An additional advantage of the process of the invention over heretofore customary processes resides in the fact that the addition of an agent like sodium carbonate to the leaching liquor to convert difficulty soluble calcium chromate to soluble sodium chromate is unnecessary. The sodium hydroxide of the leaching liquor employed in the process of the invention reacts with any calcium chromate contained in the crude chromate-bearing material to form sodium chromate and relatively insoluble calcium hydroxide. The danger of carbonization of the caustic soda of the leaching liquor by carbon dioxide of the atmosphere is eliminated by virtue of the presence in the crude chromate-bearing material of caustic lime which functions to causticize the sodium carbonate which may be formed during the course of the process.

I claim:
1. In a process for recovering sodium chromate from crude sodium chromate-bearing material involving leaching of the material with an aqueous liquid to form an aqueous solution of sodium chromate and evaporation of water contained in the solution to produce solid sodium chromate, the improvement which comprises employing for leaching the crude sodium chromate-bearing material an aqueous liquid containing sodium hydroxide in solution in substantial amount but in amount insufficient to prevent substantial solution of sodium chromate of the material, and maintaining in the aqueous liquid throughout the leaching operation sodium hydroxide in such excess over the amount which might react chemically with the components of the crude sodium chromate-bearing material that a solution is produced which upon evaporation of not more than about fifty percent of the water will give a saturated solution of sodium chromate containing less than about 476 grams of sodium chromate per liter.

2. In a process for recovering sodium chromate from crude sodium chromate-bearing material involving leaching of the material with an aqueous liquid to form an aqueous solution of sodium chromate and evaporation of water contained in the solution to produce solid sodium chromate, the improvement which comprises employing for leaching the crude sodium chromate-bearing material and aqueous liquid containing sodium hydroxide in solution in substantial amount but in amount insufficient to prevent solution of sodium chromate of the material sufficiently to form a solution containing at least 150 grams of sodium chromate per liter, and maintaining in the aqueous liquid throughout the leaching operation sodium hydroxide in such excess over the amount which might react chemically with the components of the crude sodium chromate-bearing material that a solution is produced which upon evaporation of not more than about fifty percent of the water will give a saturated solution of sodium chromate containing less than about 476 grams of sodium chromate per liter.

3. In a process for recovering sodium chromate from crude sodium chromate-bearing material involving leaching of the material with an aqueous liquid to form an aqueous solution of sodium chromate and evaporation of water contained in the solution to produce solid sodium chromate, the improvement which comprises employing for leaching the crude sodium chromate-bearing material an aqueous liquid containing sodium hydroxide in solution in amount equal to about ten percent to thirty percent of the weight of water in the liquid, and maintaining in the aqueous liquid throughout the leaching operation sodium hydroxide in amount equal to about ten percent to thirty percent of the weight of the water in the liquid and in such excess over the amount which might react chemically with the components of the crude sodium chromate-bearing material that a solution is produced which upon evaporation of not more than about fifty percent of the water will give a saturated solution of sodium chromate containing less than about 476 grams of sodium chromate per liter.

4. The method of recovering relatively pure sodium chromate from crude sodium chromate-bearing material which comprises leaching the crude sodium chromate-bearing material with an aqueous liquid containing sodium hydroxide in solution in substantial amount but in amount insufficient to prevent substantial solution of sodium chromate of the material, separating the leaching liquor from insoluble material contained in the crude chromate-bearing material, heating the leaching liquor and effecting precipitation of solid sodium chromate, separating the mother liquor from the solid sodium chromate, and utilizing the mother liquor for the treatment of additional crude sodium chromate-bearing material, sodium hydroxide being maintained in the aqueous liquid throughout the leaching operation in such excess over the amount which might react chemically with the components of the crude sodium chromate-bearing material that a solution is produced which upon evaporation of not more than about fifty percent of the water will give a saturated solution of sodium chromate containing less than about 476 grams of sodium chromate per liter.

5. The method of recovering relatively pure sodium chromate from crude sodium chromate-bearing material which comprises leaching the crude sodium chromate-bearing material with an aqueous liquid containing sodium hydroxide in solution in substantial amount but in amount insufficient to prevent solution of sodium chromate of the material sufficiently to form a solution containing at least 150 grams of sodium chromate per liter, separating the leaching liquor from insoluble material contained in the crude chromate-bearing material, heating the leaching liquor and effecting precipitation of solid sodium chromate, separating the mother liquor from the solid sodium chromate, and utilizing the mother liquor for the treatment of additional crude sodium chromate-bearing material, sodium hydroxide being maintained in the aqueous liquid throughout the leaching operation in such excess over the amount which might react chemically with the components of the crude sodium chromate-bearing material that a solution is produced which upon evaporation of not more than about fifty percent of the water will give a saturated solution of sodium chromate containing less than about 476 grams of sodium chromate per liter.

6. The method of recovering relatively pure sodium chromate from crude sodium chromate-bearing material which comprises leaching the crude sodium chromate-bearing material with an aqueous liquid containing sodium hydroxide in solution in amount equal to about ten percent to thirty percent of the weight of the water in the liquid, separating the leaching liquor from insoluble material contained in the crude chromate-bearing material, heating the leaching liquor and effecting precipitation of solid sodium chromate, separating the mother liquor from the solid sodium chromate, and utilizing the mother liquor for the treatment of additional crude sodium chromate-bearing material, sodium hydroxide being maintained in the aqueous liquid throughout the leaching operation in amount equal to about ten percent to thirty percent of the weight of the water in the liquid and in such excess over the amount which might react chemically with the components of the crude sodium chromate-bearing material that a solution is produced which upon evaporation of not more than about fifty percent of the water will give a saturated solution of sodium chromate containing less than about 476 grams of sodium chromate per liter.

MARVIN J. UDY.